Patented Sept. 12, 1922.

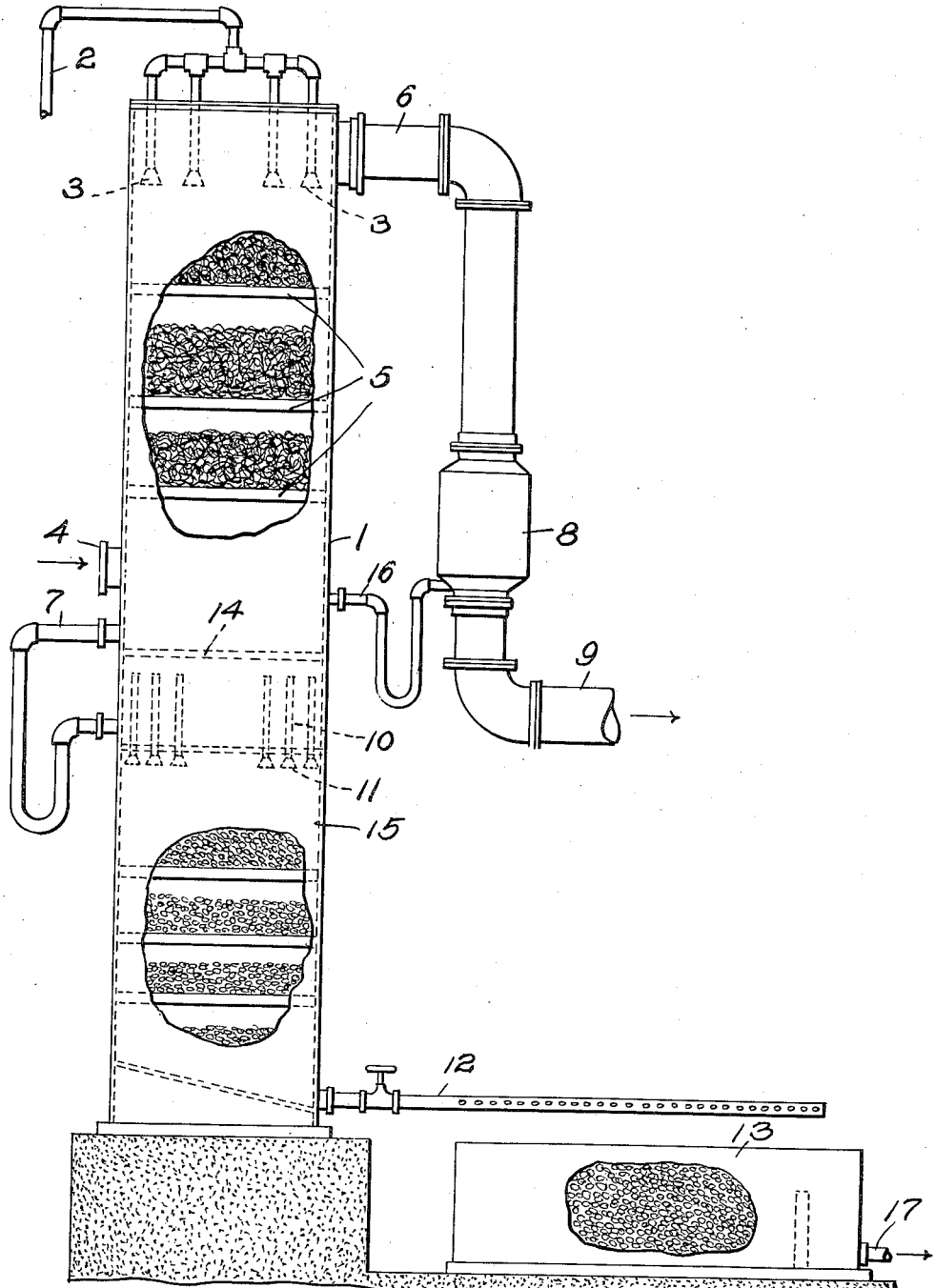

1,428,618

UNITED STATES PATENT OFFICE.

FRED W. WAGNER, OF PITTSBURGH, PENNSYLVANIA.

PURIFICATION OF WASTE LIQUID.

Application filed August 24, 1920. Serial No. 405,667.

*To all whom it may concern:*

Be it known that I, FRED W. WAGNER, residing at Pittsburgh, in the county of Allegheny and State of Pennsylvania, a citizen of the United States, have invented or discovered certain new and useful Improvements in the Purification of Waste Liquid, of which improvements the following is a specification.

My invention relates to the purification of waste liquids, and particularly to the removal of hydrocarbon acids from aqueous solution. It finds its immediate applicability in the purification of waste waters derived from the operation of bi-product coke plants.

In the operation of a bi-product coke plant the gases passing from the coking chamber are initially cooled, and in consequence of such cooling a liquid condensate separates itself from the main body of gas. This condensate is subjected to a decantation operation, and by decantation two components are separated: tar and ammonia solution. The remaining liquid from which the components just named have been separated is still rich in ammonia. The ammonia is removed from it by distillation; the residue is waste. This waste liquid passing from the ammonia still is essentially aqueous; it is reddish brown in color and is clouded by the presence of solid matter in suspension; it is somewhat heavier than water. It carries in solution and in suspension various substances, among them phenol and cresol, hydrocyanic acid, hydrogen sulphide, thyocyanates, calcium salts, and various impurities.

Of these, the substances which constitute, for reasons presently to be stated, the chief source of difficulty, are phenol, cresol, hydrocyanic acid, and hydrogen sulphide. These all are soluble in water, and are carried in the waste liquid in solution.

This waste liquid is difficult of disposal. If discharged into streams the phenol and cresol components give to the water an offensive taste, and this effect is pronounced and far-reaching, for a very minute trace is objectionable; hydrogen sulphide, present in stream water, gives to it an offensive odor; hydrocyanic acid attacks metal, and when present in water used for industrial and domestic purposes is destructive of pipes and plumbing. These difficulties are of such magnitude that the operator of a by-product coke plant who disregards them will in most localities find himself confronted with laws respecting stream pollution and nuisances.

My invention is addressed to treatment of this waste liquid from the ammonia still; by my invention the objectionable substances named are removed in such form that they can be disposed of in unobjectionable manner, and the waste liquid is so far purified that it may be discharged into streams without giving rise to difficulties such as those indicated.

Manifestly, the process which constitutes my invention is applicable, wherever the condition exists which it aims to overcome, and in defining my invention I intend that my broader claims shall cover the essential process wherever applied. But, as a concrete example, and as a basis for more specific claims, I shall proceed with a description of the invention applied to the removal of these substances severally and collectively from this waste liquid from the ammonia still in a by-product coke plant.

In the ensuing description I shall refer to the accompanying drawing, in which I show in side elevation and diagrammatically apparatus suitable for performance of the method of my invention.

1 is a gas scrubbing tower of such nature as is familiar to the art. It is a tower in which rising volumes of gas are intimately mingled with a descending rain of liquid, with the end in view of effecting a transfer of certain ingredients or components or burdens of one to the other of the two bodies. In this instance the liquid to be purified is introduced to the tower at a point near the top through a pipe 2, and is advantageously sprayed down in rain through roses 3. Gas is introduced near the bottom through an inlet 4. Within the tower at successive intermediate levels are set trays 5, of material which serves as a catalyzer in the chemical action which takes place, the particular nature of which will presently be described. The trays are preferably arranged as the drawing indicates, in such relative positions that the ascending stream of gas shall flow over the surfaces of the material filling the trays while this material is wet with liquid, and shall as it proceeds pass through showers of liquid descending from tray to tray. From the top of the tower a gas exit pipe 6, leads off; from the bottom, the liquid pipe 7.

The gas introduced is a gas which has affinity for, or a gas one of whose constituents has affinity for, the substances (phenol and cresol) to be removed from the liquid. Hydrogen is such a gas, carbon monoxide is such a gas; natural gas will serve the same end; but ordinarily in a by-product coke-oven plant it will be the coke-oven gas itself, previously relieved of its tar and ammonia contents, and preferably relieved of its benzol content also, and otherwise ready to flow to the intended point of consumption. It will be remarked of the gases specified above generically that they are what are known in chemistry as reducing gases, that is to say gases which have avidity for oxygen and which coming into contact with oxygen-containing substances react upon them by the removal from them of oxygen. The gas enters and flows through the tower under proper pressure. As is well known, the "scrubbing" effect obtained in such a tower as this is in its magnitude immediately related to pressure, and, while the process of my invention may be performed at or substantially at atmospheric pressure, I intend that the pressure shall be adjusted empyrically to every new set of conditions, and brought to the point of highest efficiency. It is desirable to maintain a pressure sufficiently high that the gas shall carry away mechanically such tarry matter as is ordinarily present in the waste liquid under consideration; on the other hand, it should not be so high as to carry over into the separating chamber (presently to be described) objectionably large quantities of the liquid.

The temperature of the gas and liquor should for the most efficient results, be approximately 60° C. With the gas at atmospheric temperature and the liquor at 60° C. excellent results will be obtained. Temperature conditions, like pressure, should be adjusted empyrically. A reducing reaction with the aid of a metallic catalyzer is generally speaking more efficient at high than at low temperature.

The catalytic agent alluded to, spread upon the trays 5, will ordinarily be copper turnings. Other material may be employed; turnings of other metals—platinum, for example, and palladium, will serve the same end. Or the metals named for other metals may be used in other forms, as, for example, in the form of plates; or, again, instead of simple metallic bodies, compound bodies may be employed, as, for example, plates of platinized asbestos.

When an essentially aqueous solution of phenol, or of cresol or of phenol and cresol and a body of such gas as has been defined are intimately mingled, as is the case in a scrubbing tower, in the presence of such a catalyzer as has been indicated, a chemical reaction will take place, the precise nature of which is obscure, but the consequence and effect will be that the phenol or cresol, or both, previously borne by the liquid in solution, will be recombined, and its constituents will be borne away in the stream of gas. The gas so burdened is not in any way damaged for its intended purpose, but, to the contrary, is augmented and enriched by the addition of combustible, heat-affording substances. The liquid, on the other hand, is relieved and cleaned of its objectionable burden.

It should here be additionally noted that the copper turnings serve, not as a catalyzer only. They are instrumental further in the precipitation by chemical reaction of cyanide compounds. Furthermore, a slight removal of hydrogen sulphide takes place in consequence of chemical reaction with copper. The presence of the catalyzer is a practical necessity. A gas containing hydrogen in nascent state would of course react in the absence of a catalyzer. A slow reaction and relatively small in extent would occur, if the usual coke-oven gas were introduced in the absence of a catalyzer. For practical purposes, as has been said, a catalyzer is necessary.

Turning attention now to the liquid passing from scrubbing tower 1, it is well to remark again that it is the waste liquid, now relieved of its phenol and cresol ingredients, but carrying still its burdens of lime and of hydrocyanic acid (the latter perhaps diminished as has been indicated) and its traces of hydrogen sulphide.

The liquid flowing through pipe 7, which is provided with a U-bend, as shown, to afford a gas seal for tower 1, is carried to filter apparatus, preferably made up of several component units. The first unit of the filter apparatus may conveniently be built as shown in the drawing in structural continuity with the tower 1 already described. As shown in the drawing, this tower consists of a single vertically disposed cylindrical casing. It is divided within, intermediate its height, by an imperforate partition 14. That portion above the partition constitutes the scrubbing tower 1 already described; the portion below the partition is the first unit of the filter apparatus. This lower portion of the tower, to which the reference numeral 15 is applied, is provided internally with trays, similar to those in the scrubbing tower, already described. The trays in this lower filtration portion of the tower are filled with iron borings.

This superposition of scrubbing tower on filtration apparatus makes for simplicity of structure, and furthermore permits of a simple gravity flow of liquid from the scrubbing tower to the filter. The liquid flowing from the scrubbing tower through pipe 7 enters the filter unit 15 through roses 11, and rains down on the uppermost of the trays of iron borings. It percolates through these borings, dripping down from tray to tray until, gathering in the bottom it is led off through a pipe 12 to the second unit of the filtration apparatus. In this filter unit 15, the iron borings with which the trays are laden serve as an absorber, and remove by reaction the hydrogen compounds, notably hydrogen sulphide, remaining in the liquid as it passes from scrubbing tower 1. The iron borings further afford material upon which the hydrocyanic acid present in the liquid, and the hydrogen sulphide react, to produce insoluble salts.

Allusion has been made above to a separating chamber. It is found at 8 in the drawing. It is a chamber into which the gas passing out from the scrubbing tower 1 is initially led, and there particles of liquid carried in the sweep of the stream of gas through the scrubbing tower separate by gravity and collect in the bottom of the chamber. A pipe 16 (also properly shaped to constitute a gas seal) carries the accumulation back, to unite with the liquid which collects in a pool in the bottom of tower 1. The gas, relieved of such liquid particles, passes on from separating chamber 8 through a lead 9 to its destination.

The liquid having passed through filter unit 15 and undergone there the absorption and reactions indicated, passes on to a second unit 13. This is essentially a simple filter bed of suitable inert material, coke braize is a convenient substance available at a plant of the nature under consideration. The liquid gathering in a pool in the bottom of filter unit 15 may conveniently be conveyed by gravity through a pipe 12 the end of which, extending over the filter bed in unit 13, is perforated. Through the perforated pipe 12 the liquid will be sprayed upon the filter bed. From filter unit 13 the now purified liquid may escape through a pipe 17 and be discharged into some convenient stream, without consequent embarrassments such as those indicated. The material of which the filter beds are composed may, when used until no longer serviceable, be disposed of without difficulty.

I have now shown and described a filtration apparatus composed of two essential units. The showing is here in some sense diagrammatic; these units, one or both of them, may be multiplied as conditions warrant, or again the unit as a whole may be duplicated and reduplicated.

The material spread on the trays of filter unit 15 is, as has been indicated, preferably iron borings; it might be metallic iron in another suitable form, or it might be a salt of iron; again, it might be another metal, or the salt of another metal which, acted upon by hydrocyanic acid, will produce an insoluble salt, or which will separate the hydrogen and hydrogen compounds by absorption or reaction.

The material constituting the filter bed in unit 13 may be chosen from a wide range of substances, including coke, lignite, animal charcoal, wood charcoal, wood sawdust, wood shavings, and fuller's earth. Some of these substances, be it noted, contain cellulose, and these have the further advantage, in addition to the filtration operation already indicated, of absorbing such faint traces as may still remain of phenol and cresol.

Manifestly, the order in which the two essential steps of the method as applied to coke-oven liquid are performed may be inverted, but the preferable order is that given in the foregoing description.

As I have already said, my invention is not necessarily conditioned by nor confined to operations in a by-product coke plant. It is there that the invention was made, and it is there that its commercial value primarily lies; but it is applicable wherever waste liquors are to be relieved of these substances or their homologues or equivalents. The process is by no means confined to or limited by the apparatus shown.

I claim as my invention:

1. The process herein described of removing a hydrocarbon compound from aqueous solution, which consists in causing a stream of reducing gas to pass through and out from said solution and as it passes through to mingle intimately with such solution in the presence of a catalyzer.

2. The process herein described of removing hydrocarbon acid from aqueous solution, which consists in causing a stream of a reducing gas to pass through and out from said solution and as it passes through to mingle intimately with such solution in the presence of a catalyzer.

3. The process herein described of removing phenol and cresol from aqueous solution, which consists in causing a stream of a reducing gas to pass through and out from said solution and as it passes through to mingle intimately with such solution in the presence of a catalyzer.

4. The process herein described of removing phenol from aqueous solution, which consists in causing a stream of a reducing gas to pass through and out from said solution and as it passes through to mingle intimately with such solution in the presence of a catalyzer.

5. The method herein described of treating the waste liquid from the ammonia still of a by-product coke plant, which consists in subjecting the liquid successively to two steps: one, causing a stream of a reducing gas to penetrate the liquid in the presence of a catalyzer and having so penetrated to pass out from the liquid, and the other, causing the liquid which remains after the performance of the first step to mingle with a substance with which hydrocyanic acid forms an insoluble salt.

6. The method herein described of purifying an aqueous solution containing phenol and a cyanide compound which consists in first bringing the solution into intimate mingling with a reducing gas in the presence of copper, and subsequently subjecting the modified solution to filtration.

7. The method herein described of treating waste liquid from the ammonia still of a by-product coke plant, which consists in subjecting the liquid successively to two steps: one, causing a hydrogen-containing gas to penetrate the liquid in the presence of a catalyzer and having so penetrated to pass out from said liquid, and the other causing the liquid which remains after the performance of the first step to percolate through two beds: the first, a bed of finely divided iron, the second a filter bed of inert material.

8. The method herein described of treating waste liquid from the ammonia still of a by-product coke plant, which consists in causing coke-oven gas to penetrate the liquid, in the presence of a catalyzer, and having so penetrated to pass out from the liquid.

9. The herein described method of removing phenol from aqueous solution which consists in causing a hydrogen-containing gas to penetrate the solution, in the presence of a catalyzer, and having so penetrated to pass out from the solution, and causing the liquid, after the accomplishment of the step just defined, to percolate through a bed of cellulose-containing material.

10. The method herein described of treating waste liquid from the ammonia still of a by-product coke plant, which consists in causing a stream of a reducing gas to pass through said solution and as it passes through to mingle intimately with such solution in the presence of finely divided copper and having passed through to pass out from said solution.

11. The method herein described of treating waste liquid from the ammonia still of a by-product coke-oven plant and removing from coke-oven gases their sulphurous contents which consists in causing the said gas to penetrate the said liquid in the presence of finely divided copper and having so penetrated to pass out from the said liquid.

12. The method herein described of purifying the waste liquid from the ammonia still of a by-product coke oven plant, which consists in first causing coke-oven gas to pass through the liquid in the presence of finely divided copper and then having so passed through to pass out from said liquid, causing the liquid after the first step has been performed to percolate through a bed of finely divided iron; and, third, filtering the liquid as it passes from the second step described through a filter bed of coke.

In testimony whereof I have hereunto set my hand.

FRED W. WAGNER.

Witnesses:
JOHN CARRUTHERS,
W. N. McCLURE.